United States Patent Office 3,481,475
Patented Dec. 2, 1969

3,481,475
APPARATUS FOR THE CONTINUOUS SEPARATION OF SOLIDS FROM A LIQUID FLOWING IN A CONDUIT
Klaus Ruthrof, Bubenreuth, and Gerhard Schwarzer, Erlangen, Germany, and Jose Domenech Agell, Enrique Veiga Mir, and Jesus Colell Artigas, Barcelona, Spain, assignors to Siemens Aktiengesellschaft
Filed Jan. 2, 1968, Ser. No. 695,040
Claims priority, application Germany, Jan. 18, 1967, S 107,884
Int. Cl. B01d 29/38
U.S. Cl. 210—304  4 Claims

ABSTRACT OF THE DISCLOSURE

A screen of substantially conical configuration is positioned in a conduit in which liquid flows with its conical surface sloping toward its axis counter to the direction of flow of the liquid. A torus is formed in the conduit in the area of the base of the screen to widen the conduit in such area. Additional conduits open into the torus tangentially with the axis of the torus to supply rinsing material and to remove separated solids. The liquid in the conduit is whirled either upstream of the screen or in the area of the screen.

DESCRIPTION OF THE INVENTION

The present invention relates to the separation of solids from a liquid. More particularly, the invention relates to an apparatus for the continuous separation of solids from a liquid flowing in a conduit.

In steam power plants along the sea shore, sea water is often utilized in the condensers and for cooling purposes. Although the sea water may be mechanically purified prior to its use, it is often contaminated by sea shells and the like. These shells may develop or grow in the storage tanks during the period of time and may also develop in the pumping chamber behind the rakes and/or screen belts utilized to mechanically purify the water. When the areas in which the sea shells are developed are cleaned or rinsed, the sea shells clog the individual pipes of the condensers. The development or growth of sea shells has been combated by the addition of chemicals such as, for example, additional chlorides. However, the added chemicals often exceed the desirable limit and produce adverse effects which far outweigh any advantages which may be gained from their use. The principal object of the present invention is to provide a new and improved apparatus for the continuous separation of solids from liquid flowing in a conduit. The apparatus of the present invention functions with efficiency, effectiveness and reliability to continuously separate solids from a liquid. The apparatus of the present invention functions economically and without the need for maintenance to continuously separate solids from a liquid. The apparatus of the present invention functions to provide cooling water which is devoid of undesired solids or substances which may clog the cooling pipes of condensers or the like.

In accordance with the present invention, apparatus for the continuous separation of solids from a liquid flowing in a conduit comprises a screen of substantially conical configuration positioned in the conduit with its conical surface between its base and its vertex sloping toward its axis counter to the direction of flow of the liquid in the conduit. A torus is formed in the conduit in the area of the base of the screen to widen the conduit in the area and additional conduits open into the torus tangentially with the axis of the torus for supplying rinsing material and for removing separated solids. The base of the screen is substantially in contact with the conduit adjacent and downstream from the torus. The additional conduits comprise an input conduit for supplying rinsing material and an output conduit for removing separated solids.

A plurality of guide vanes may be provided on the screen in the area of the vertex thereto for producing whirling in the liquid in the conduit. Ancillary conduits may be provided upstream from the screen opening into the conduit tangentially with the axis of the conduit for supplying additional liquid to produce whirling in the liquid in the conduit. At least some of the guide vanes extend from the screen to the conduit thereby maintaining the vertex area of the screen in position.

In order that the present invention may be readily carried into effect, it will now be described with reference to the accompanying drawing, wherein.

Figure 1:
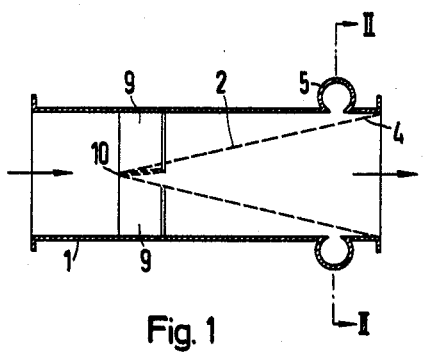
FIG. 1 is a longitudinal view, partly in section, of the apparatus of the present invention.

In FIG. 1, liquid flows in the direction of the arrows through a conduit 1. A screen 2 of substantially conical configuration is positioned in the conduit 1 with its conical surface between its base 4 and its vertex 10 sloping toward its axis counter to the direction of flow of the liquid in the conduit. The screen 2 is positioned substantially coaxially with the conduit 1 and the base of said screen is substantially in contact with said conduit and the base 4 is substantially in contact with said conduit.

Figure 2:
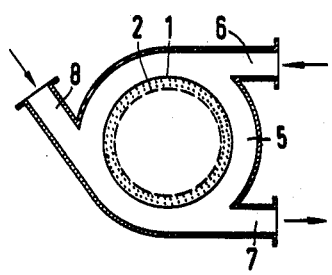
FIG. 2 is a view taken along the lines II—II of FIG. 1.

As shown in FIGS. 1 and 2, a torus 5 is formed in the conduit 1 in the area of the base 4 of the screen 2 to widen said conduit in said area. The base 4 of the screen 2 contacts the conduit 1 adjacent and downstream from the torus 5.

Additional conduits 6, 7 and 8, which may comprise any suitable conduits such as, for example, pipes or nozzles, open into the torus 5 tangentially with the axis of said torus. Rinsing liquid, which may or may not include rinsing material, is supplied to the torus 5 via the conduits 6 and 8, as indicated by the arrows in FIG. 2. The rinsing liquid produces a rotary flow or whirl in the liquid in the widened area of the conduit produced by the torus 5 to expedite the expulsion of separated solids from said torus via the conduit 7, as indicated by the arrow at said conduit in FIG. 2. Any suitable number of additional conduits such as, for example, one, two, or more, may be utilized to expedite the expulsion of separated solids from the torus 5. An additional conduit may be provided, opening into the torus 5, to permit access to said torus in the event of disturbances.

As shown in FIG. 1, a plurality of guide vanes 9 are provided on the screen 2 in the area of the vertex 10 thereof. The guide vanes 9 are so inclined that they produce whirling or a rotary flow in the liquid flowing in the conduit 1. The whirling produced in the liquid by the guide vanes 9 causes larger sized solids to be thrown toward the inner surface of the conduit 1 so that such larger sized solids reach the torus 5 with greater facility. Some or all of the guide vanes 9 extend from the screen 2 to the conduit 1 to maintain the vertex area of said screen in position. The support of the screen 2 at its vertex area by the guide vanes 9 is essential in steam power plants wherein said screen is of considerable axial length.

Figure 3:
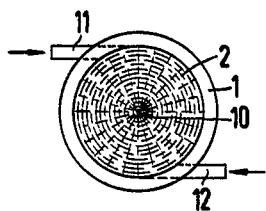
FIG. 3 is an axial end view of a modification of FIG. 1.

Instead of producing whirling or a rotary flow in the liquid in the area of the screen 2, by means of the guide vanes 9, such whirling may be produced upstream of said screen. This is accomplished, as shown in the modification of FIG. 3, by ancillary conduits 11 and 12. The ancillary conduits 11 and 12 open into the conduit 1 upstream from the screen 2 tangentially with the axis of said conduit and supply additional liquid to said conduit to produce whirling in the liquid. The whirling or rotary flow produced by the guide vanes 9 or the ancillary conduits 11 and 12 results in a twisting or spiral type of flow which facilitates the movement of the solids in the liquid toward the surface of the conduit 1 and thus into the widened area provided by the torus 5. The additional liquid provided by the ancillary conduits provides a simple control of the intensity of the imparted whirl or rotary flow.

In operation, the screen 2, separates solids in the liquid flowing through the conduit 1. Upon separation by the screen 2, the solids glide or slide along the sloping surface of said screen from the area of its vertex 10 to the area of its base 4. In the area of the base 4 of the screen 2, the separated solids enter the torus 5 or the widened area provided by said torus. The rinsing liquid provided by the additional conduits 6 and 8 transports the solids in the torus 5 and expels them from said torus and from the conduit 1 via the additional conduit 7.

If the screen 2 becomes clogged with solids such as, for example, shells or shell particles, or the like, it may be cleared or cleaned by shutting off the liquid upstream of said screen via any suitable means such as, for example, a shutoff valve (not shown in the figures). After the liquid is shut off, the rinsing liquid is supplied via the additional conduits 6 and 8 to produce a whirling flow of liquid in the torus 5. The whirling flow of liquid in the torus 5 produces whirling or a rotary flow in the liquid remaining in the conduit 1, so that solid particles on the surface of the screen 2 are thrown outward by centrifugal force toward the surface of said conduit. When the shutoff valve (not shown in the figures) is then opened, the solid particles are readily removed via the normal operation of the apparatus.

The apparatus of the present invention is, of course, not limited to the purification of cooling water for the condensers of steam power plants or to the separation or removal of sea shells, or the like, from sea water. On the contrary, the application of the apparatus of the present invention to sea water is described for illustrative purposes only. The apparatus of the present invention may be utilized in any system in which it is desired to reliably separate large particles or solids from flowing liquids.

We claim:
1. Apparatus for the continuous separation of solids from liquid flowing in a conduit, comprising
   a screen of substantially conical configuration positioned in the conduit with its conical surface between its base and its vertex sloping toward its axis counter to the direction of flow of liquid in said conduit;
   a torus formed in said conduit in the area of the base of said screen to widen said conduit in said area; and
   conduit means opening into said torus tangentially with the axis of said torus for supplying rinsing means and for removing separated solids, said conduit means comprises an input conduit for supplying rinsing means and an output conduit for removing separated solids, and the base of said screen is substantially in contact with said conduit adjacent and downstream from said torus.
2. Apparatus as claimed in claim 1, further comprising a plurality of guide vanes on said screen in the area of the vertex thereof for producing whirling in the liquid in said conduit.
3. Apparatus as claimed in claim 1, further comprising ancillary conduit means opening into said conduit upstream from said screen tangentially with the axis of said conduit for supplying additional liquid to produce whirling in the liquid in said conduit.
4. Apparatus as claimed in claim 2, wherein at least some of said guide vanes extend from said screen to said conduit thereby maintaining the vertex area of said screen in position.

References Cited
UNITED STATES PATENTS

| 540,539 | 6/1895 | Conness | 55—336 |
| 2,869,677 | 1/1959 | Yellott et al. | 55—431 X |
| 3,061,098 | 10/1962 | Brezinski | 210—304 X |
| 3,394,533 | 7/1968 | Shengli et al. | 55—456 X |

SAMIH N. ZAMARNA, Primary Examiner

U.S. Cl. X.R.

55—336, 431; 209—273, 305; 210—433, 446